(12) United States Patent
Ma

(10) Patent No.: US 11,308,692 B2
(45) Date of Patent: Apr. 19, 2022

(54) METHOD AND DEVICE FOR PROCESSING IMAGE, AND STORAGE MEDIUM

(71) Applicant: BEIJING DAJIA INTERNET INFORMATION TECHNOLOGY CO., LTD., Beijing (CN)

(72) Inventor: Liqian Ma, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 0 days.

(21) Appl. No.: 16/901,379

(22) Filed: Jun. 15, 2020

(65) Prior Publication Data
US 2020/0312022 A1 Oct. 1, 2020

(30) Foreign Application Priority Data
Jun. 14, 2019 (CN) .......................... 201910514429.5

(51) Int. Cl.
*G06T 17/00* (2006.01)
*G06T 17/20* (2006.01)
*G06T 7/33* (2017.01)
*G06T 15/20* (2011.01)

(52) U.S. Cl.
CPC ............ *G06T 17/205* (2013.01); *G06T 7/344* (2017.01); *G06T 15/205* (2013.01)

(58) Field of Classification Search
CPC ...... G06T 17/205; G06T 7/344; G06T 15/205
See application file for complete search history.

(56) References Cited

U.S. PATENT DOCUMENTS

| | | | | |
|---|---|---|---|---|
| 2013/0342527 | A1* | 12/2013 | Molyneaux | G06T 17/20 345/419 |
| 2014/0176565 | A1* | 6/2014 | Adeyoola | G06F 16/5854 345/473 |
| 2014/0313192 | A1* | 10/2014 | Corazza | G06T 13/40 345/420 |
| 2018/0336737 | A1* | 11/2018 | Varady | G06T 7/62 |
| 2019/0035149 | A1* | 1/2019 | Chen | G06T 7/50 |
| 2020/0273248 | A1* | 8/2020 | Jorgensen | G06T 9/001 |
| 2020/0327726 | A1* | 10/2020 | Lin | G06K 9/00281 |
| 2020/0356760 | A1* | 11/2020 | Li | G06T 7/344 |
| 2020/0380780 | A1* | 12/2020 | Lysenkov | G06K 9/00268 |

* cited by examiner

*Primary Examiner* — Sarah Lhymn
(74) *Attorney, Agent, or Firm* — Meunier Carlin & Curfman LLC

(57) ABSTRACT

Embodiments of the present disclosure relates to a method and device for processing an image, and a nonvolatile storage medium. The method includes: acquiring a first image and a first virtual object having a corresponding relationship with a preset standard model, the first image includes a target object; determining control information based on the target object and the standard model; obtaining a second virtual object matched with the target object by processing the first virtual object based on the control information; and generating a second image; the second image includes the target object fitted with the second virtual object.

9 Claims, 7 Drawing Sheets

METHOD AND DEVICE FOR PROCESSING IMAGE, AND STORAGE MEDIUM

CROSS-REFERENCE TO RELATED APPLICATIONS

This application is based on and claims priority under 35 U.S.C 119 to Chinese Patent Application No. 201910514429.5, filed on Jun. 14, 2019, in the China National Intellectual Property Administration. The entire disclosure of the above application is incorporated herein by reference.

FIELD

The present disclosure relates to the technical field of image processing, in particular to a method and device for processing an image, and a storage medium.

BACKGROUND

With the popularization of applications (APP), such as short video, selfie beauty and the like, more and more users like to add special effects to photos or videos, such as the special effect of a human head 3D ornament, that is, the human head 3D ornament, a virtual object, is fitted to the human head in a shooting scene, thereby increasing the visual effect.

SUMMARY

According to a first aspect of an embodiment of the present disclosure, a method for processing an image is provided, and the method for processing the image includes:

acquiring a first image and a first virtual object, wherein the first virtual object has a corresponding relationship with a preset standard model; wherein the image comprises a target object;

determining control information based on the target object and the standard model;

obtaining a second virtual object based on the first virtual object and the control information; wherein the second virtual object is matched with the target object, and generating a second image based on the second virtual object, wherein the second image comprise the target object fitted with the second virtual object.

According to a second aspect of the embodiment of the present disclosure, a device for processing an image is provided, and the device includes:

a processor; and a memory for storing computer executable instructions; wherein the processor is configured to execute the computer executable instructions to implement the method for processing the image of the first aspect.

According to a third aspect of the embodiment of the present disclosure, a nonvolatile storage medium is provided. The nonvolatile storage medium is configured to store computer executable instructions, when the computer executable instructions are executed by a processor of an electronic apparatus, the method for processing the image of the first aspect is implemented.

BRIEF DESCRIPTION OF THE DRAWINGS

The drawings herein are incorporated into and constitute a part of this specification, show embodiments consistent with this disclosure, are used to explain the principles of this disclosure together with this specification and do not constitute an undue limitation to this disclosure.

DETAILED DESCRIPTION OF THE EMBODIMENTS

In order to enable those of ordinary skill in the art to better understand the technical schemes of the present disclosure, the technical schemes in embodiments of the present disclosure will be clearly and completely described in conjunction with the accompanying drawings.

With the popularization of applications (APP), such as short video, selfie beauty and the like, more and more users like to add special effects to photos or videos, such as the special effect of a human head 3D ornament, that is, the human head 3D ornament, a virtual object, is fitted to the human head in a shooting scene, thereby increasing the visual effect.

In the related art, adding the special effects to the human head requires face recognition, detection of key points on the recognized human face, then optimization of a rigid transformation matrix from a standard human head model to the current human face (namely the face of a user) and direct rendering of the human head 3D ornament by using the rigid transformation matrix.

In the related art, the human head 3D ornament is stretched to ensure that the human head 3D ornament is fitted to the current human face. However, in the related art, the human head 3D ornament only considers the degree of fitting, but does not take into account the particularity of the current human face. For example, the particularity may be the degree of fatness of the human face, the shape of a contour, the size of the contour and the like, resulting in a large deviation in fitting effect and affecting the visual effect.

An embodiment of the present disclosure provides a method for processing an image and device, an electronic apparatus and a storage medium. A virtual object is processed based on a target object, so that the virtual object has the particularity of the target object. In this way, when the virtual object is fitted to the target object, the virtual object and the target object can be better fitted, and the two after fitting can be coordinated, thereby having a better fitting effect.

Figure 1:
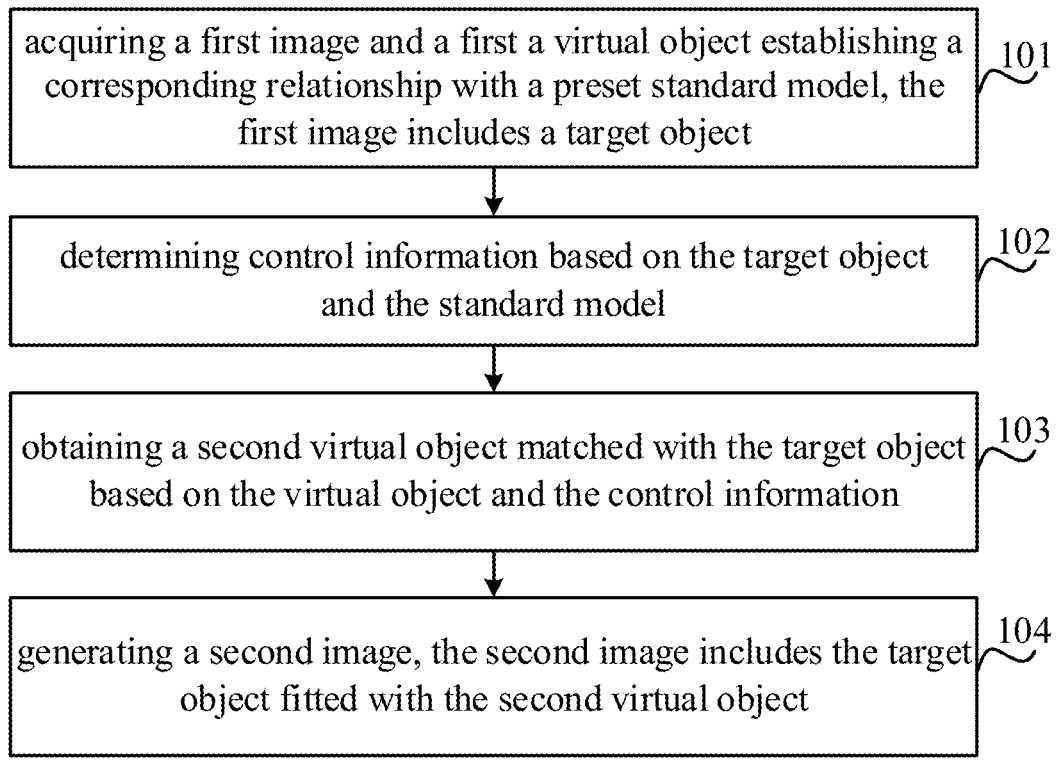
FIG. 1 is a flow diagram of a method for processing an image shown according to an exemplary embodiment.

FIG. 1 is a flow diagram of a method for processing an image shown according to an exemplary embodiment, and the method for processing the image may be applied to an electronic apparatus or an APP (application). As shown in FIG. 1, the method for processing the image includes Step 101-Step 104.

In Step 101, acquiring a first image and a first virtual object having a corresponding relationship with a preset standard model; the first image includes a target object.

In some embodiments, the electronic apparatus may have an image acquisition function, so that a user may shoot the target object by adopting a camera, wherein the target object may be a person, a pet or other objects, and the target object may be a person in the subsequent embodiments. The electronic apparatus may display in real time during the image acquisition process, so as to obtain a framing range. In this way, the electronic apparatus may recognize various objects in the framing range by adopting an image recognition method in the related art, and select the preset target object from them. Of course, the electronic apparatus may also determine that an object corresponding to a selection operation is the target object based on the selection operation (such as clicking and select loop) of the user.

Of course, the electronic apparatus may also acquire a pre-stored image or video and the like from a specified location, such as a local memory, a cloud end and the like and then recognize the target object from the image or video. It should be noted that, those of skill may select a proper way of acquiring the target object based on a specific scenario. In the case that the target object can be determined, corresponding schemes fall within the protection scope of the present application.

It should be noted that the requirement of fitting a virtual object may be determined based on the selection operation, such as a fitting function option or a fitting mode and the like of the user or be determined as soon as the user selects the virtual object. Those of skill may select the proper way of determining the fitting requirement and the corresponding control function based on the specific scenario, and corresponding schemes fall within the protection scope of the present application.

In some embodiments, the electronic apparatus may also acquire the virtual object having a corresponding relationship with the preset standard model. The virtual object may include a human head 3D ornament. Furthermore, in some embodiments, the selected virtual object may also be preprocessed to establish a Second-mapping from the standard model to the virtual object. The time for preprocessing the virtual object may be at the configuration of the electronic apparatus or the APP, before Step 101 or during Step 101, and may also be set by those of skill based on the specific scenario, which is not limited herein.

Figure 2:
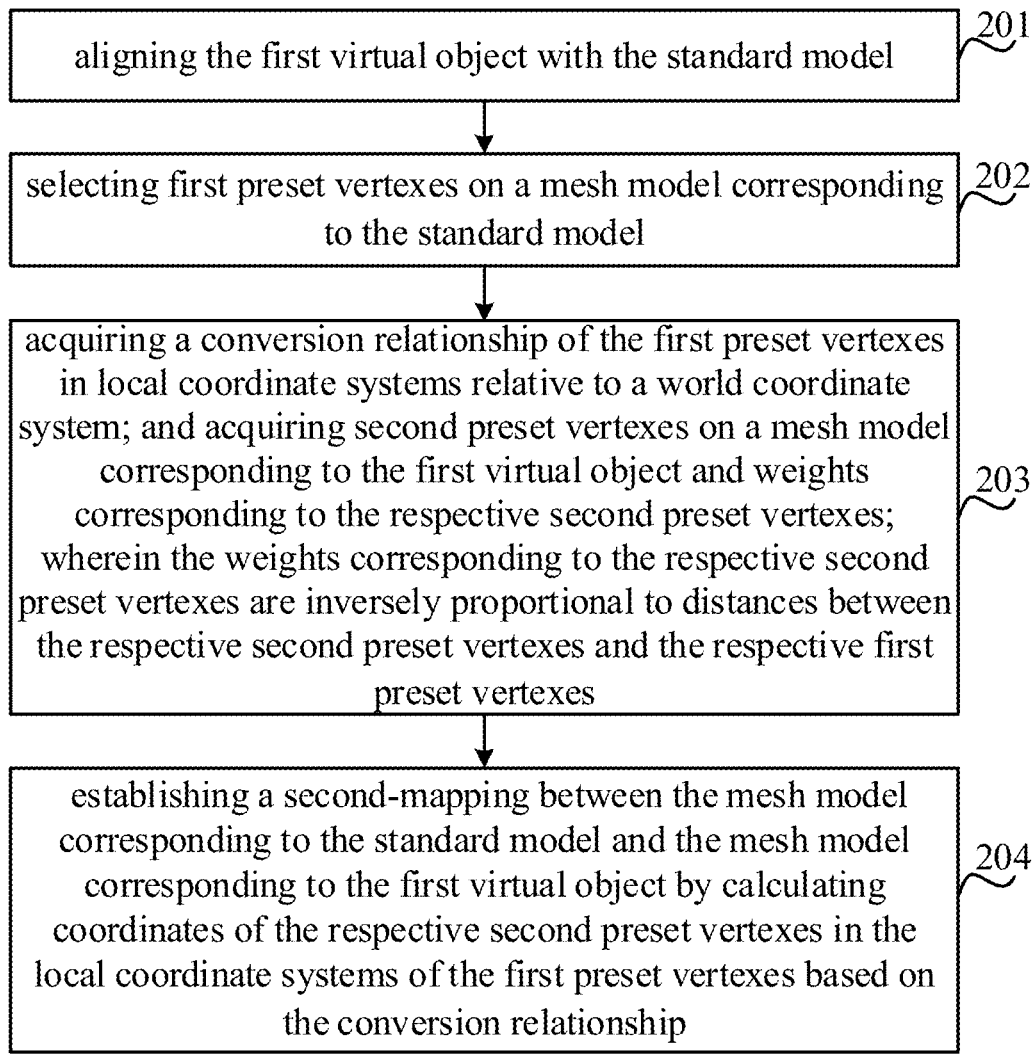
FIG. 2 is a flow diagram of another method for processing an image shown according to an exemplary embodiment.

Referring to FIG. 2, the electronic apparatus may first align the first virtual object and the standard model (corresponding to Step 201 in FIG. 2), wherein the alignment means that a fitting area formed by the first virtual object and a fitting area on the standard model are substantially the same in shape and area. It should be noted that automatic alignment may be adopted during alignment. A certain number of fitting points may be set on the first virtual object and the standard model, and after fitting, it is determined that the alignment has been realized when the sum of distances between the corresponding pairs of fitting points is the smallest. Of course, the user can participate in the alignment process, and the user determines that the alignment has been realized. It should be understood that in the case that the first virtual object and the standard model can be aligned, all schemes fall within the protection scope of the present application.

Then, after the first virtual object is aligned with the standard model, the electronic apparatus may select first n preset vertexes from a mesh model corresponding to the standard model (corresponding to Step 201 in FIG. 2), wherein n is a positive integer. The first n preset vertexes may be used as feature points of the target object in a sample image. In order to distinguish from preset vertexes on the first virtual object, they are called as the first preset vertexes herein.

Taking a human head as an object as an example, feature points of the first preset vertexes may be bone points of the head, and these bone points can accurately show the contour of the human head, facial features, face shape and the like. In some embodiments, considering that the first virtual object needs to be fitted to the target object, the selected first preset vertexes may be fitting positions or close to the fitting positions of the first virtual object on the target object, for example, the fitting positions may be corners of eyes, forehead, ears and the like of the face. Of course, those of skill may select the proper first preset vertexes based on the specific scenario. In the case that the characteristics of the standard model can be expressed accurately, corresponding schemes fall within the protection scope of the present application.

In some embodiments, the number of the first preset vertexes may be 5-10. In this way, in the case that the characteristics of the standard model can be accurately expressed, the data volume is reduced and the processing efficiency is improved. It should be understood that the first preset vertexes may be artificially set by the user of the electronic apparatus or technical personnel who designs a fitting algorithm. Of course, the first preset vertexes may also be selected by the electronic apparatus itself, and corresponding schemes fall within the protection scope of the present application.

As the standard model is a three-dimensional model, each first preset vertex corresponds to a local coordinate system, so the electronic apparatus may acquire a conversion relationship of the first preset vertexes in the local coordinate systems relative to a world coordinate system (corresponding to Step 203 in FIG. 2).

Of course, the electronic apparatus may also acquire second preset vertexes on the first virtual object and weights corresponding to the respective second preset vertexes during Step 203. The weights corresponding to the respective second preset vertexes are inversely proportional to distances between the respective second preset vertexes and the respective first preset vertexes (also corresponding to Step 203 in FIG. 2). Wherein, the number of the second preset vertexes may be adjusted comprehensively based on accuracy and processing speed, which is not limited herein.

Considering a position relationship between the second preset vertexes and the first preset vertexes, the closer the second preset vertexes to the first preset vertexes, the greater the influence on the second preset vertexes after the positions of the first preset vertexes change. In such scenario, the weights of the second preset vertexes may be set to be larger, that is, in the world coordinate system, the distances between the respective second preset vertexes and the first preset vertexes are inversely proportional to the weights of the respective second preset vertexes. It should be understood that the sum of the weights of all the second preset vertexes is 1. Of course, when the weights are set to be other values only based on the magnitude, the weights further need to be normalized, so that the sum of the weights of all the second preset vertexes after normalization is 1, then the corresponding effects of the present application may be also realized, and corresponding schemes fall within the protection scope of the present application.

It should be noted that, in some embodiments, before calculating coordinates of the respective second preset vertexes in the local coordinate systems of the first preset vertexes or selecting the second preset vertexes, a skinning operation may also be performed on the first virtual object. In some embodiments, the purpose of the skinning operation is to characterize the changes of all the vertexes on the first virtual object by the changes of the positions of part of the vertexes (namely the second preset vertexes) on the first virtual object after the skinning operation, thereby being conductive to reducing the calculation amount of data. Of course, in some embodiments, the changes of all the vertexes may also be obtained, thereby being conductive to improving the accuracy of results.

Finally, the electronic apparatus may calculate the coordinates of the respective second preset vertexes in the local coordinate systems of the first preset vertexes on the basis of the conversion relationship to establish a Second-mapping from the mesh model corresponding to the standard model to a mesh model corresponding to the first virtual object (corresponding to Step 204 in FIG. 2).

For example, the second preset vertexes are represented by $B_j$ (j=0, 1, . . . , m−1, m is the number of the second preset vertexes), and the weights $w_{ji}$ of the second preset vertexes $B_j$ relative to the first preset vertexes $A_i$ represent the degree of influence on $B_j$ by $A_i$, wherein $w_{j0}+w_{j1}+w_{j2}+\ldots+w_{j,n-1}=1$.

Further, the first preset vertexes are represented by $A_i$ (i=0, 1, . . . , n−1), and the conversion relationship of the local coordinate systems of the first preset vertexes $A_i$ relative to the world coordinate system is $M_i$, M (X, 1) T=(Y, 1) T, and then Y=f (M, X). In this example, the coordinates $C_{ji}$ of the second preset vertexes $B_j$ in the local coordinate systems of the first preset vertexes $A_i$ is equal to $f(M_{i-1}, B_j)$. Namely, the Second-mapping from the standard model to the first virtual object may be established by preprocessing the first virtual object.

In Step 102, determining control information based on the target object and the standard model.

Figure 3:
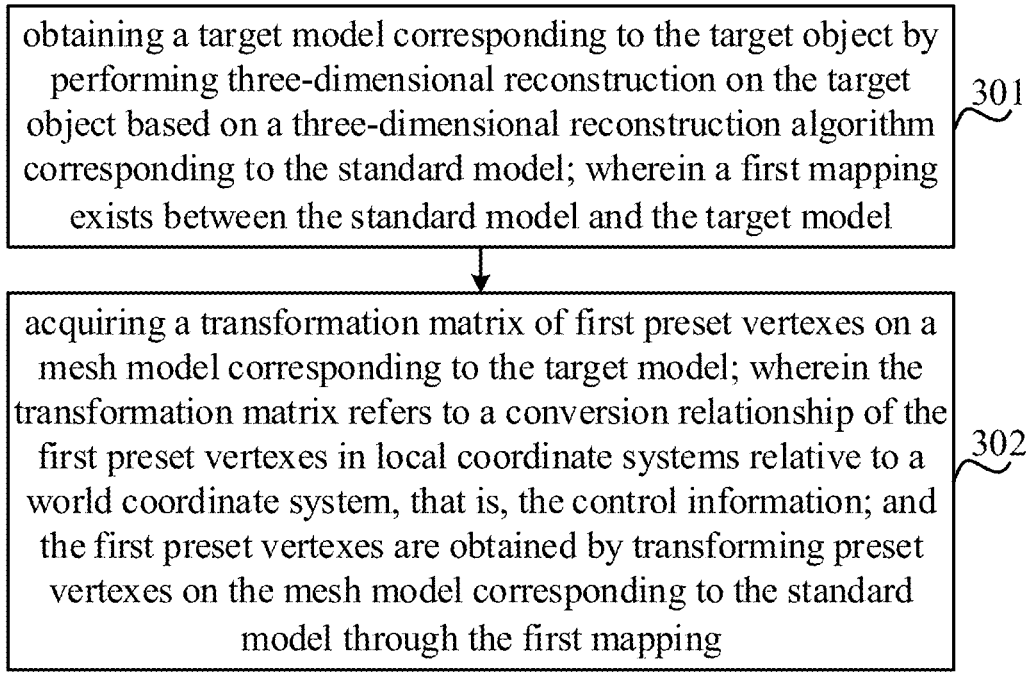
FIG. 3 is a flow diagram of still another method for processing an image shown according to an exemplary embodiment.

In some embodiments, the electronic apparatus may acquire the control information based on the target object and the preset standard model. Referring to FIG. 3, the electronic apparatus may acquire a preset three-dimensional reconstruction algorithm; and the three-dimensional reconstruction algorithm corresponds to a standard model. The three-dimensional reconstruction algorithm may be completed by training based on the preset sample image, so that a standard model may be generated when a corresponding sample image is input. In some embodiments, the three-dimensional reconstruction algorithm may include a transformable human head model. Of course, those of skill in the art may select a proper three-dimensional reconstruction algorithm based on the specific scenario. In the case that three-dimensional reconstruction can be performed on the target object, a corresponding algorithm falls within the protection scope of the present application.

Then, the electronic apparatus may perform three-dimensional reconstruction on the target object based on the three-dimensional reconstruction algorithm to obtain a target model corresponding to the target object; and a first mapping from the target model to the standard model exists (corresponding to Step 301 in FIG. 3). In some embodiments, the three-dimensional reconstruction algorithm may perform three-dimensional reconstruction on input data. If the input data is a sample image, a standard model corresponding to the sample image is obtained; and if the input data is a target object, a target model corresponding to the target object is obtained. As the same three-dimensional reconstruction algorithm is adopted in some embodiments for acquiring the model, the target model may be expressed by adopting the standard model or the target model is a transformed standard model, the transformed part reflects the difference between the target object and the sample image, namely the target model contains the particularity of the user.

After that, the electronic apparatus may acquire a transformation matrix of first preset vertexes A on a mesh model corresponding to the target model. The transformation matrix refers to a conversion relationship of the first preset vertexes in local coordinate systems relative to a world coordinate system, that is, the control information; and the first preset vertexes are obtained by transforming third preset vertexes on the mesh model corresponding to the standard model through the first mapping (corresponding to Step 302 in FIG. 3).

In Step 103, generating a second virtual object based on the first virtual object and the control information; the second virtual object is matched with the target object.

Figure 4:
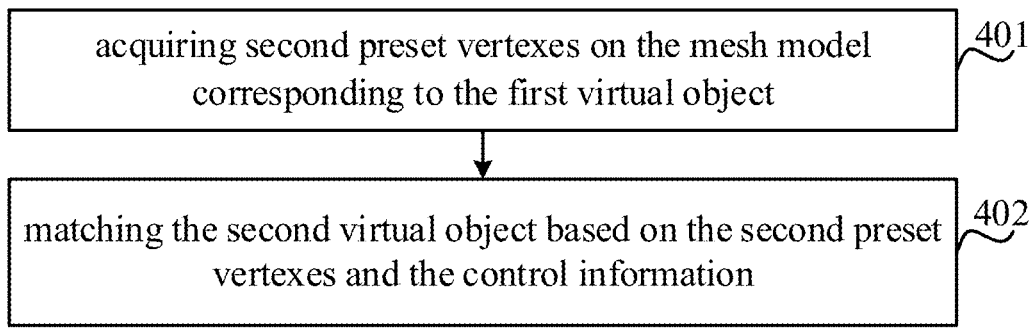
FIG. 4 is a flow diagram of yet another method for processing an image shown according to an exemplary embodiment.

In some embodiments, the electronic apparatus may process the first virtual object based on the control information. Referring to FIG. 4, the electronic apparatus may acquire second preset vertexes B on the second mesh model corresponding to the first virtual object (corresponding to Step 401 in FIG. 4). Then, the electronic apparatus may process the second preset vertexes B based on the control information to match the second virtual object with the target object (corresponding to Step 402 in FIG. 4). For example, the control information is a transformation matrix $N_i$ of the local coordinate systems of the first preset vertexes relative to the world coordinate system. In other words, the transformation matrix $N_i$ may be regarded as the amount of change of the first preset vertexes on the target model, i.e. the transformed standard model, in the world coordinate system. As the world coordinate system is constant, no matter how the local coordinate systems change, the positions of the respective preset vertexes in the world coordinate system may be accurately expressed, thereby improving the calculation accuracy. In this way, the coordinates of the second preset vertexes $B_j$ on the second mesh model corresponding to the first virtual object in the world coordinate system are:

$$D_j = f(N_0, C_{j0}) * w_{j0} + f(N_1, C_{j1}) * w_{j1} + \ldots + f(N_{n-1}, C_{j,n-1}) * w_{j,n-1}.$$

In Step 104, generating a second image based on the second virtual, the second image includes the target object fitted with the second virtual object.

In some embodiments, the electronic apparatus may fit the second virtual object to the target object to obtain the target object which is fitted with the second virtual object, and the fitting way may consider the contents of the above embodiments, which are not repeated redundantly here.

Figure 5:
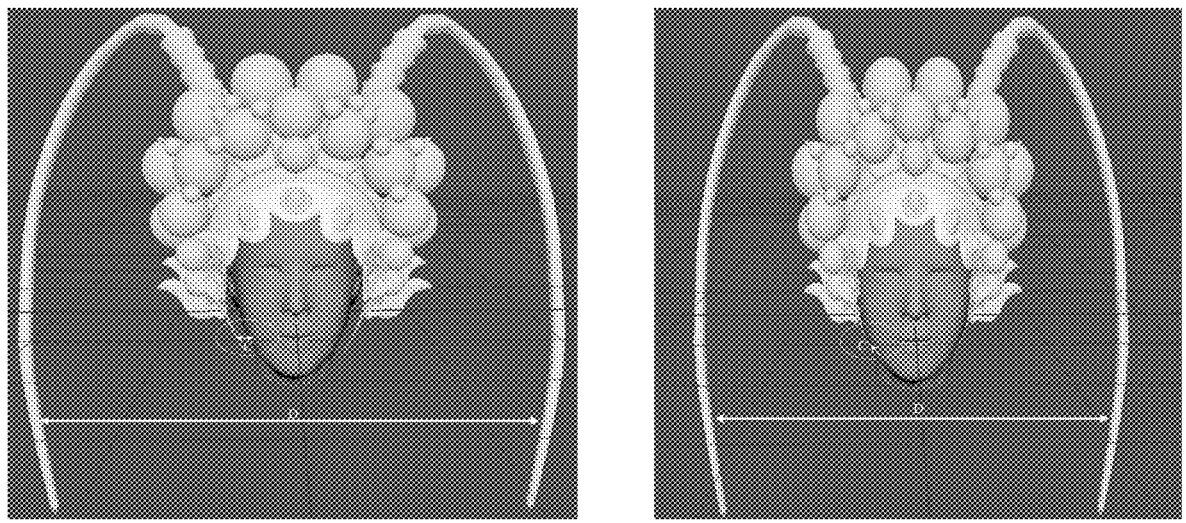
FIG. 5 is an application effect diagram of a method for processing an image shown according to an exemplary embodiment.

In some embodiments, after fitting the second virtual object and the target object, the electronic apparatus may also render and display the target object which is fitted with the second virtual object, and the effect is as shown in FIG. 5. Referring to FIG. 5, the effect after fitting in the related art is shown on the left picture in FIG. 5, and the effect after fitting in the present application is shown on the right picture in FIG. 5. By comparing the left picture and the right picture, at the position C in the left picture, the distance between the human head 3D ornament and the edge of the face of the user with a relatively thin facial form is larger; at the position C in the right picture, the human head 3D ornament is coincident with the edge of the face of the user with the relatively thin facial form, namely the distance becomes small and even the fitting degree is very good; and at the position D in the left picture, the width between two plaits of the human head 3D ornament is larger, at the position D in the right picture, the human head 3D ornament and the face shape of the user with the relatively thin facial form are adjusted synchronously, the width between the two plaits becomes small, the effect after fitting is re-matched, and the effect is more beautiful.

In some embodiments, the image containing the target object and the virtual object establishing the corresponding relationship with the preset standard model are acquired; then, the control information is acquired based on the target object and the standard model; after that, the virtual object is processed based on the control information, and the virtual object matched with the target object is obtained after processing; and finally, the processed virtual object is fitted to the target object to obtain the image with the processed virtual object fitted to the target object. In this way, in some embodiments, the different control information may be acquired based on the different target objects, and the virtual object is processed based on the different control information to enable the processed virtual object to match with the target object, namely the virtual object may be adaptively adjusted based on the target object to enable the virtual object to have the particularity of the target object, thereby being conductive to improving the accuracy and the fitting effect when the virtual object and the target object are fitted.

Figure 6:
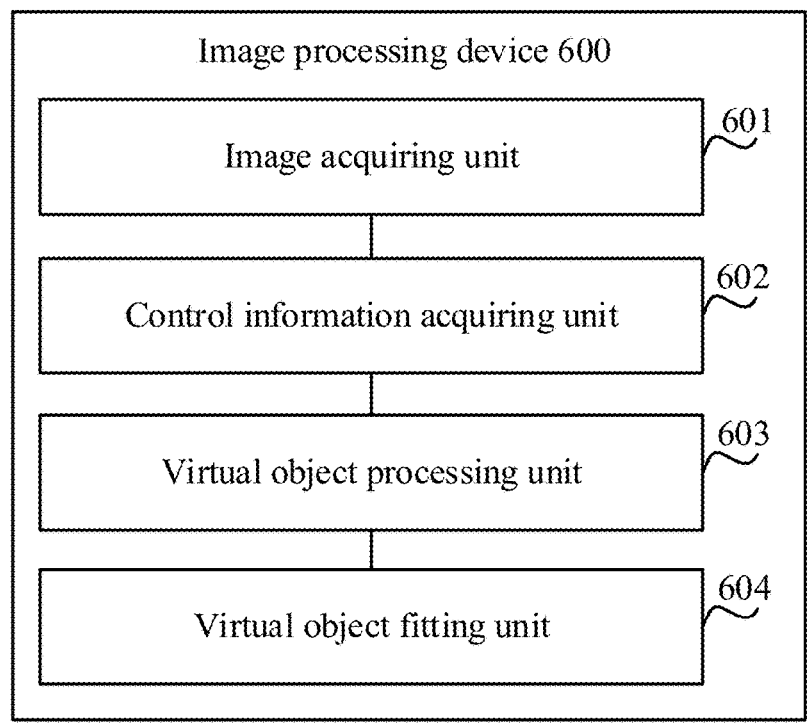
FIGS. 6-9 are block diagrams of a device for processing an image shown according to an exemplary embodiment.

FIG. 6 is a block diagram of a device for processing an image shown according to an exemplary embodiment. Referring to FIG. 6, the device for processing image 600 includes:

an image acquiring unit 601 configured to acquire a first image containing a target object and a first virtual object establishing a corresponding relationship with a preset standard model;

a control information acquiring unit 602 configured to acquire control information based on the target object and the standard model;

a virtual object processing unit 603 configured to obtain a second virtual object matched with the target object by processing the first virtual object based on the control information to; and a virtual object fitting unit 604 configured to obtain a second image with the second virtual object fitted to the target object by fitting the second virtual object to the target object.

Figure 7:
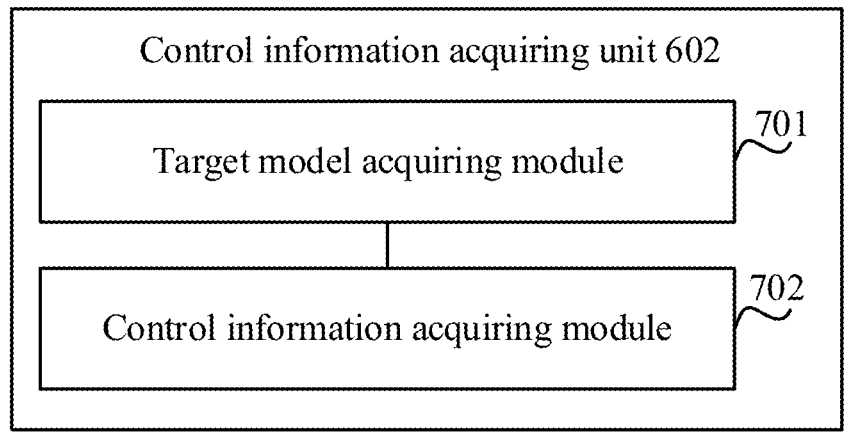

FIG. 7 is a block diagram of another device for processing an image shown according to an exemplary embodiment. On the basis of the virtual object fitting device shown in FIG. 6, the control information acquiring unit 602 includes:

a target object acquiring module 701 configured to obtain a target model corresponding to the target object by performing a three-dimensional reconstruction on the target object based on a three-dimensional reconstruction algorithm corresponding to the standard model; wherein a first mapping exists between the standard model and the target model; and a control information acquiring module 702 configured to acquire a transformation matrix of first preset vertexes on a mesh model corresponding to the target model; wherein the transformation matrix refers to a conversion relationship of the first preset vertexes in local coordinate systems relative to a world coordinate system, that is, the control information; and the first preset vertexes are obtained by transforming third preset vertexes on a mesh model corresponding to the standard model through the first mapping.

Figure 8:
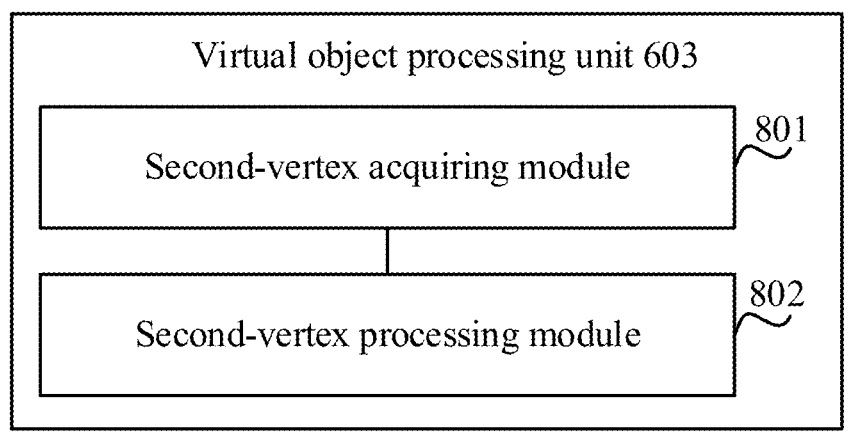

FIG. 8 is a block diagram of another device for processing an image shown according to an exemplary embodiment. On the basis of the virtual object fitting device shown in FIG. 6, the virtual object processing unit 603 includes:

a second-vertex acquiring module 801 configured to acquire second preset vertexes on a mesh model corresponding to the first virtual object; and a second-vertex processing module 802 configured to match the virtual object with the target object by processing the second preset vertexes based on the control information.

Figure 9:
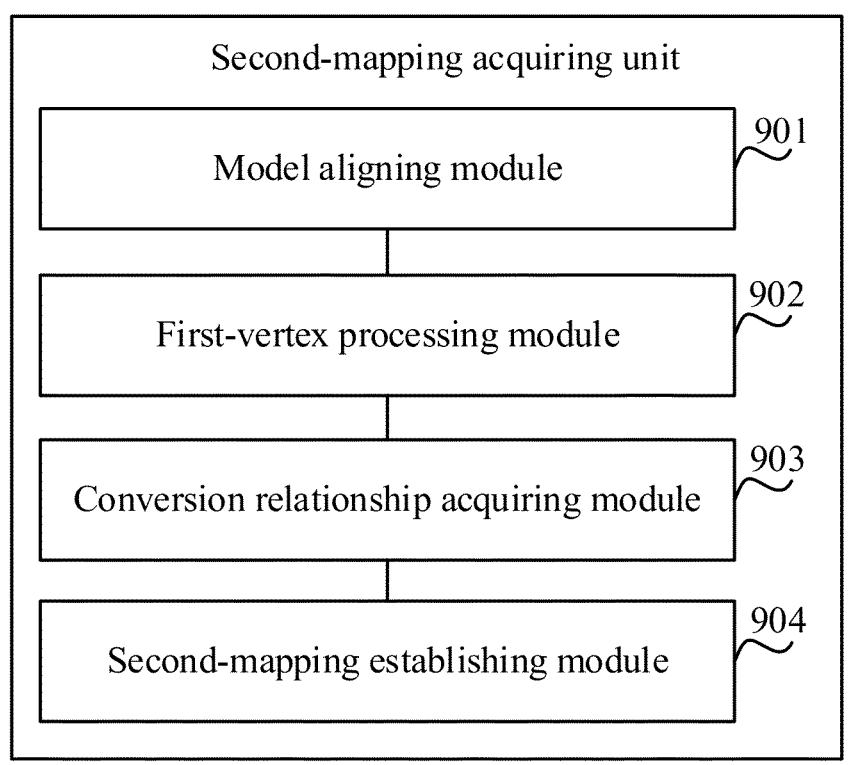

FIG. 9 is a block diagram of another device for processing an image shown according to an exemplary embodiment. On the basis of the virtual object fitting device shown in FIG. 6, the device further includes a second-mapping acquiring unit configured to acquire a second-mapping existing from the standard model to the first virtual object, and the second-mapping acquiring unit includes:

a model aligning module 901 configured to align the first virtual object with the standard model;

a first-vertex processing module 902 configured to select first preset vertexes on the mesh model corresponding to the standard model;

a conversion relationship acquiring module 903 configured to acquire a conversion relationship of the first preset vertexes in the local coordinate systems relative to the world coordinate system; and acquire the second preset vertexes on the mesh model corresponding to the virtual object and weights corresponding to the respective second preset vertexes; wherein the weights corresponding to the respective second preset vertexes are inversely proportional to distances between the respective second preset vertexes and the respective first preset vertexes; and a second-mapping establishing module 904 configured to establish a second-mapping from the mesh model corresponding to the standard model to the mesh model corresponding to the first virtual object by calculating coordinates of the respective second preset vertexes in the local coordinate systems of the first preset vertexes on the basis of the conversion relationship.

Regarding the devices in the above embodiments, the specific way in which each module operates has been described in detail in some embodiments of the related method, and will not be elaborated here.

In some embodiments, the image containing the target object and the virtual object establishing the corresponding relationship with the preset standard model are acquired; then, the control information is acquired based on the target object and the standard model; after that, the virtual object is processed based on the control information, and the virtual object matched with the target object is obtained after processing; and finally, the processed virtual object is fitted to the target object to obtain the image with the processed virtual object fitted to the target object. In this way, in some embodiments, the different control information may be acquired based on the different target objects, and the virtual object is processed based on the different control information to enable the processed virtual object to match with the target object, namely the virtual object may be adaptively adjusted based on the target object to enable the virtual object to have the particularity of the target object, thereby being conductive to improving the accuracy and the fitting effect when the virtual object and the target object are fitted.

Figure 10:
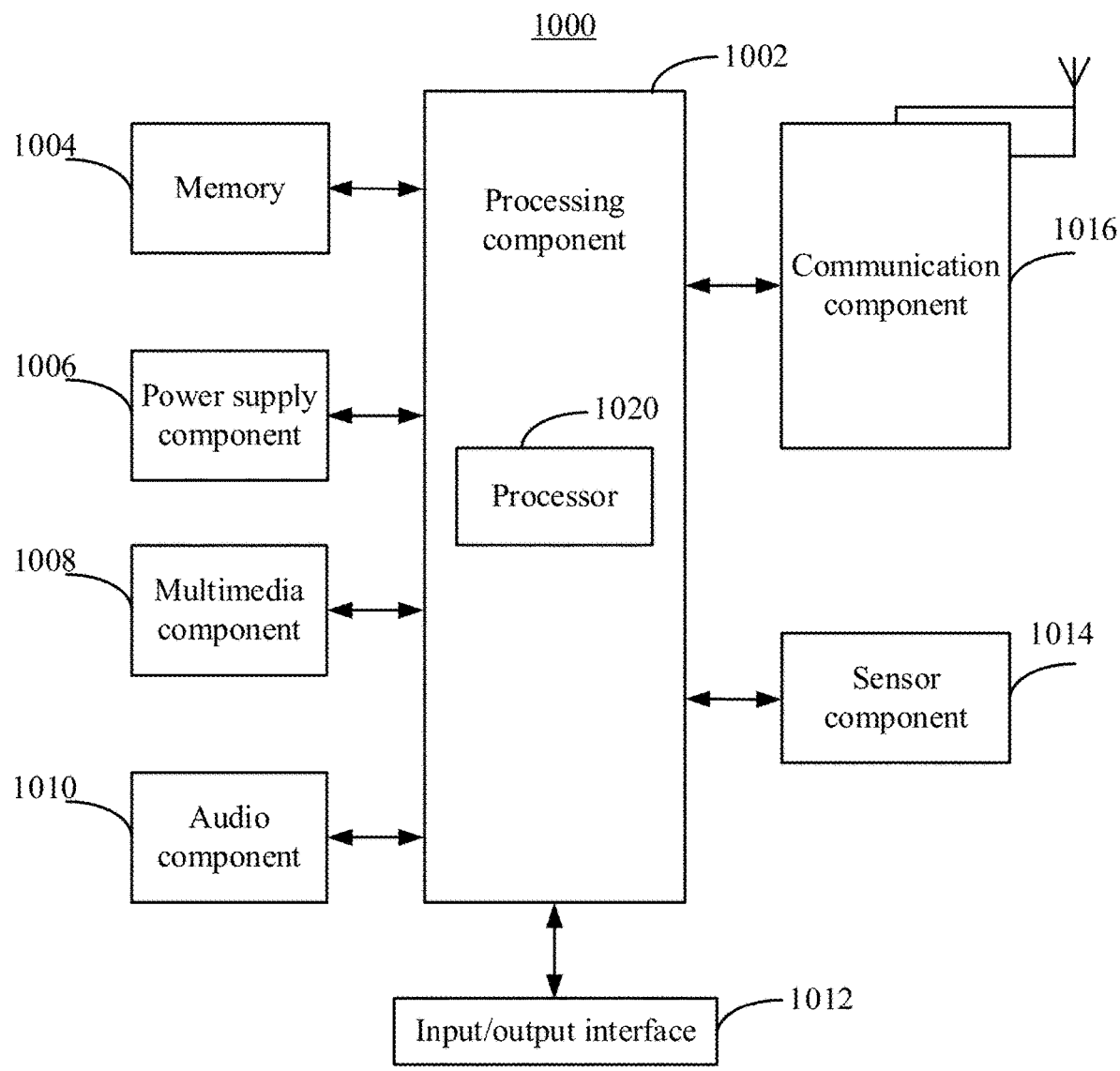
FIG. 10 is a block diagram of an electronic apparatus shown according to an exemplary embodiment.

FIG. 10 is a block diagram of an electronic apparatus shown according to an exemplary embodiment. For example, the electronic apparatus 1000 may be a mobile phone, a computer, a digital broadcasting terminal, a messaging apparatus, a game console, a tablet apparatus, a medical apparatus, a fitness apparatus, a personal digital assistant or the like.

Referring to FIG. 10, the electronic apparatus 1000 may include one or more of the following components: a processing component 1002, a memory 1004, a power supply component 1006, a multimedia component 1008, an audio component 1010, an input/output (I/O) interface 1012, a sensor component 1014 and a communication component 1016.

The processing component 1002 generally controls overall operations of the electronic apparatus 1000, such as the operations associated with display, telephone calls, data communication, camera operations, and recording operations. The processing component 1002 may include one or more processors 1020 to execute instructions to complete all or part of the steps in the above method. In addition, the processing component 1002 may include one or more modules to facilitate interaction between the processing component 1002 and other components. For example, the processing component 1002 may include a multimedia module to facilitate the interaction between the multimedia component 1008 and the processing component 1002.

The memory 1004 is configured to store various types of data to support the operations on the electronic apparatus 1000. Examples of such data include instructions for any application or method operating on the electronic apparatus 1000, contact data, phone book data, messages, pictures, videos and the like. The memory 1004 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk.

The power supply component 1006 provides power to various components of the electronic apparatus 1000. The power supply component 1006 may include a power supply management system, one or more power supplies and other components associated with generating, managing, and distributing power for the electronic apparatus 1000.

The multimedia component 1008 includes a screen that provides an output interface between the electronic apparatus 1000 and a user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touch, swipe, and gestures on the touch panel. The touch sensors may not only sense the boundaries of touch or swipe actions, but also detect the duration and pressure related to touch or swipe operations. In some embodiments, the multimedia component 1008 includes a front camera and/or a rear camera. When the electronic apparatus 1000 is in an operation mode, such as a shooting mode or a video mode, the front camera and/or the rear camera may receive external multimedia data. Each of the front camera and the rear camera may be a fixed optical lens system or have focal length and optical zoom capability.

The audio component 1010 is configured to output and/or input audio signals. For example, the audio component 1010 includes a microphone (MIC). When the electronic apparatus 1000 is in an operation mode, such as a calling mode, a recording mode, and a voice recognition mode, the microphone is configured to receive external audio signals. The received audio signals may be further stored in the memory 1004 or sent via the communication component 1016. In some embodiments, the audio component 1010 further includes a speaker for outputting the audio signals.

The I/O interface 1012 provides an interface between the processing component 1002 and a peripheral interface module. The peripheral interface module may be a keyboard, a click wheel or buttons. These buttons may include, but are not limited to, a home button, a volume button, a start button and a lock button.

The sensor component 1014 includes one or more sensors for providing the electronic apparatus 1000 with state assessment in various aspects. For example, the sensor component 1014 may detect an on/off state of the electronic apparatus 1000, and the relative positioning of the components, for example, the components are a display and a keypad of the electronic apparatus 1000. The sensor component 1014 may also detect the change of the position of the electronic apparatus 1000 or one component of the electronic apparatus 1000, the presence or absence of the contact between the user and the electronic apparatus 1000, the orientation or acceleration/deceleration of the electronic apparatus 1000 and the change of the temperature of the electronic apparatus 1000. The sensor component 1014 may include a proximity sensor configured to detect the presence of nearby objects without any physical contact. The sensor component 1014 may also include a light sensor, such as a CMOS or CCD image sensor for use in imaging applications. In some embodiments, the sensor component 1014 may also include an acceleration sensor, a gyro sensor, a magnetic sensor, a pressure sensor or a temperature sensor.

The communication component 1016 is configured to facilitate wired or wireless communication between the electronic apparatus 1000 and other apparatuses. The electronic apparatus 1000 may access a wireless network based on a communication standard, such as WiFi, an operator network (such as 2G, 3G, 4G or 5G), or a combination thereof. In an exemplary embodiment, the communication component 1016 receives broadcast signals or broadcast related information from an external broadcast management system via a broadcast channel. In an exemplary embodiment, the communication component 1016 further includes a near field communication (NFC) module to facilitate short-range communication. For example, the NFC module may be implemented on the basis of a radio frequency identification (RFID) technology, an infrared data association (IrDA) technology, an ultra-wideband (UWB) technology, a Bluetooth (BT) technology and other technologies.

In some embodiments of the present disclosure, the electronic apparatus 1000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements so as to execute the above method.

In some embodiments of the present disclosure, a non-transitory computer-readable storage medium including instructions is further provided, for example, a memory 1004 including the instructions, and the above instructions may be executed by the processor 1020 of the electronic apparatus 1000 to complete the above method for processing an image. For example, the non-transitory computer-readable storage medium may be a ROM, a random access memory (RAM), a CD-ROM, a magnetic tape, a floppy disk, an optical data storage device or the like.

In some embodiments of the present disclosure, an application program is also provided. When the application program is executed by the processor of the electronic apparatus, the electronic apparatus can execute the above method for processing an image to obtain the same technical effects.

In some embodiments of the present disclosure, a computer program product is also provided. When the computer program product is executed by the processor of the electronic apparatus, the electronic apparatus can execute the above method for processing an image to obtain the same technical effects.

It should be noted that, in this context, relational terms such as first and second are merely used to distinguish one entity or operation from another entity or operation, and do not necessarily require or imply that there is any such actual relation or order between these entities or operations. Furthermore, the terms "include", "contain" or any other variations thereof are intended to encompass a non-exclusive inclusion, such that a process, method, item, or apparatus that includes a plurality of elements includes not only those elements but also other elements which are not listed clearly, or also includes the elements which are inherent to such process, method, item or apparatus. Without more limitations, the element that is defined by the phrase "including a . . . " does not exclude the presence of additional equivalent elements in the process, method, item, or apparatus that includes the element.

The embodiments in this specification are described in related ways. The same or similar parts among the various embodiments may refer to each other. Each embodiment emphasizes the differences between it and other embodiments. In particular, for the device/electronic apparatus/ storage medium embodiments, as they are basically similar to the method embodiment, the description is relatively simple, and the related parts may refer to the parts of the method embodiment.

Those skilled in the art will easily think of other embodiments of the present disclosure after considering the description and practicing the disclosure herein. This application is intended to cover any variations, uses or adaptive changes of the present disclosure, which follow the general principles of the present disclosure, and include common general knowledge or customary technical means in the technical field which are not disclosed in the present disclosure. The description and embodiments are only considered as exemplary, and the true scope and the spirit of the present disclosure are indicated by the following claims.

It should be understood that the present disclosure is not limited to the precise structure that has been described above and shown in the drawings, and various modifications and changes may be made without departing from the scope thereof. The scope of the present disclosure is only limited by the appended claims.

The invention claimed is:

1. A method for processing image, comprising:
acquiring a first image and a first virtual object, wherein the first image comprises a target object, the first virtual object has a corresponding relationship with a preset standard model, and the preset standard model is obtained by a three-dimensional reconstruction algorithm and a sample image;
determining a target model by reconstructing the target object in three-dimension based on the three-dimensional reconstruction algorithm, wherein the target model corresponds to the target object;
obtaining first preset vertexes on a first mesh model corresponding to the target model by transforming third preset vertexes on a third mesh model corresponding to the standard model through a first mapping between the target model and the standard model;
obtaining control information based on a transformation matrix of the first preset vertexes in local coordinate systems relative to a world coordinate system;
obtaining a second virtual object, by processing the first virtual object based on the control information, wherein the second virtual object is matched with the target object, and
generating a second image based on the second virtual object, wherein the second image comprise the target object fitted with the second virtual object.

2. The method for processing image according to claim 1, wherein said obtaining the second virtual object comprises:
acquiring second preset vertexes on a second mesh model, wherein the second mesh model corresponds to the first virtual object; and
obtaining the second virtual object based on the second preset vertexes and the control information.

3. The method for processing image according to claim 1, wherein before obtaining a second virtual object based on the first virtual object and the control information, the method further comprises:
aligning the first virtual object with the standard model;
selecting third preset vertexes on the third mesh model;
acquiring a conversion relationship of the third preset vertexes in local coordinate systems relative to a world coordinate system;
determining second preset vertexes on a second mesh model and weights corresponding to respective second preset vertexes; wherein the second mesh model corresponds to the first virtual object, the weights are inversely proportional to distances between the respective second preset vertexes and respective third preset vertexes; and
establishing a second-mapping between a third mesh model and the second mesh model by calculating coordinates of the respective second preset vertexes in the local coordinate systems of the third preset vertexes based on the conversion relationship.

4. A device for processing image, comprising:
a processor; and
a memory for storing computer executable instructions; wherein the processor is configured to execute the computer executable instructions in the memory to perform following:
acquiring a first image and a first virtual object, wherein the first virtual object has the first image comprises a target object, the first virtual object has a corresponding relationship with a preset standard model, and the preset standard model is obtained by a three-dimensional reconstruction algorithm and a sample image;
determining a target model by reconstructing the target object in three-dimension based on the three-dimensional reconstruction algorithm, wherein the target model corresponds to the target object;
obtaining first preset vertexes on a first mesh model corresponding to the target model by transforming third preset vertexes on a third mesh model corresponding to the standard model through a first mapping between the target model and the standard model;
obtaining control information based on a transformation matrix of the first preset vertexes in local coordinate systems relative to a world coordinate system;

obtaining a second virtual object, by processing the first virtual object based on the control information; wherein the second virtual object is matched with the target object, and generating a second image based on the second virtual object, wherein the second image comprise the target object fitted with the second virtual object.

5. The method for processing image according to claim 4, wherein the processor is configured to execute the computer executable instructions in the memory to obtain the second virtual object by:

acquiring second preset vertexes on a second mesh model, wherein the second mesh model corresponds to the first virtual object; and obtaining the second virtual object based on the second preset vertexes and the control information.

6. The device for processing image according to claim 4, wherein the processor is further configured to execute the computer executable instructions in the memory to perform following:

before obtaining a second virtual object based on the first virtual object and the control information, aligning the first virtual object with the standard model;

selecting third preset vertexes on the third mesh model;

acquiring a conversion relationship of the third preset vertexes in local coordinate systems relative to a world coordinate system;

determining second preset vertexes on a second mesh model and weights corresponding to respective second preset vertexes; wherein the second mesh model corresponds to the first virtual object, the weights are inversely proportional to distances between the respective second preset vertexes and respective third preset vertexes; and establishing a second-mapping between a third mesh model and the second mesh model by calculating coordinates of the respective second preset vertexes in the local coordinate systems of the third preset vertexes based on the conversion relationship.

7. A nonvolatile storage medium, configured to store computer executable instructions, when the computer executable instructions are executed by a processor of an electronic apparatus, following is implemented:

acquiring a first image and a first virtual object, wherein the first image comprises a target object, the first virtual object has a corresponding relationship with a preset standard model, and the preset standard model is obtained by a three-dimensional reconstruction algorithm and a sample image;

determining a target model by reconstructing the target object in three-dimension based on the three-dimensional reconstruction algorithm, wherein the target model corresponds to the target object;

obtaining first preset vertexes on a first mesh model corresponding to the target model by transforming third preset vertexes on a third mesh model corresponding to the standard model through a first mapping between the target model and the standard model;

obtaining control information based on a transformation matrix of the first preset vertexes in local coordinate systems relative to a world coordinate system;

obtaining a second virtual object, by processing the first virtual object based on the control information, wherein the second virtual object is matched with the target object, and generating a second image based on the second virtual object, wherein the second image comprise the target object fitted with the second virtual object.

8. The nonvolatile storage medium according to claim 7, wherein when the computer executable instructions are executed by the processor, said obtaining the second virtual object comprises:

acquiring second preset vertexes on a second mesh model, wherein the second mesh model corresponds to the first virtual object; and obtaining the second virtual object based on the second preset vertexes and the control information.

9. The nonvolatile storage medium according to claim 7, wherein when the computer executable instructions are executed by the processor, following is implemented:

before obtaining a second virtual object based on the first virtual object and the control information, aligning the first virtual object with the standard model;

selecting third preset vertexes on the third mesh model;

acquiring a conversion relationship of the third preset vertexes in local coordinate systems relative to a world coordinate system;

determining second preset vertexes on a second mesh model and weights corresponding to respective second preset vertexes; wherein the second mesh model corresponds to the first virtual object, the weights are inversely proportional to distances between the respective second preset vertexes and respective third preset vertexes; and establishing a second-mapping between a third mesh model and the second mesh model by calculating coordinates of the respective second preset vertexes in the local coordinate systems of the third preset vertexes based on the conversion relationship.

* * * * *